United States Patent [19]

Pyke et al.

[11] Patent Number: 4,996,262

[45] Date of Patent: Feb. 26, 1991

[54] POLYESTER REINFORCED RUBBER

[75] Inventors: James B. Pyke, Akron; Richard G. Bauer, Kent; Donald J. Burlett, Wadsworth, all of Ohio

[73] Assignee: The Goodyear Tire & Rubber Company, Akron, Ohio

[21] Appl. No.: 329,214

[22] Filed: Mar. 27, 1989

[51] Int. Cl.$^5$ .................. C08L 23/30; C08L 15/00
[52] U.S. Cl. .................................. 525/177; 525/64;
525/167; 525/173; 525/174; 525/175
[58] Field of Search ............... 525/92, 173, 177, 92,
525/174, 177, 175

[56] References Cited

U.S. PATENT DOCUMENTS

| | | | |
|---|---|---|---|
| 4,290,927 | 9/1981 | Tanaka | 525/177 |
| 4,594,388 | 6/1986 | Arai | 525/177 |
| 4,753,980 | 6/1988 | Deyrup | 525/173 |
| 4,843,124 | 6/1989 | Wolfe | 525/92 |

*Primary Examiner*—Patricia Short
*Attorney, Agent, or Firm*—Alvin T. Rockhill

[57] ABSTRACT

It is often desirable to increase the modulus of rubbers utilized in a wide variety of applications. This invention discloses a technique for modifying rubbers to improve their modulus without sacrificing other properties. By utilizing the process of this invention, rubber compositions having increased modulus are prepared by grafting polyester onto rubber. This can be accomplished by reacting a polydiene rubber with a thioacid or maleic anhydride and subsequently with the polyester. It is also possible to prepare such polyester modified rubber compositions by reacting an epoxidized rubber with the polyester.

18 Claims, No Drawings

POLYESTER REINFORCED RUBBER

BACKGROUND OF THE INVENTION

It is sometimes desirable to increase the modulus of rubber compounds. For instance, it is generally desirable to increase the modulus of rubber compounds which are utilized in tire tread base compositions and in tire wire coat compounds. A higher degree of stiffness in such rubber compositions is conventionally attained by incorporating larger amounts of fillers, such as carbon black, into the rubber compounds and/or by increasing the state of cure of such compounds. Unfortunately, both of these techniques lead to undesirable results. For instance, the incorporation of additional carbon black into rubber compounds typically leads to high levels of hysteresis. Accordingly, the utilization of such compounds in tires results in excessive heat build-up and poor cut growth characteristics. The utilization of high amounts of sulfur to attain a high state of cure typically leads to poor aging resistance. Furthermore, it is highly impractical to reach high levels of stiffness by increased state of cure alone. For these reasons, it is not possible to attain the desired degree of stiffness in tire tread base compounds by simply adding higher levels of fillers or curatives.

SUMMARY OF THE INVENTION

The subject invention discloses a technique for modifying a rubber so as to greatly increase its modulus. This results in the rubber being better suited for applications where a high degree of stiffness is desirable. However, this modification procedure does not generally sacrifice other desirable characteristics of the rubber. For instance, the rubber compositions of this invention have an increased modulus but do not have an increased degree of hysteresis.

The rubber compositions of this invention are prepared by grafting polyester onto the rubber. This can be done by reacting at least one thio acid with the rubber and at least one polyester. This procedure grafts polymer chains which are comprised of polyester onto the polymer chains of the rubber.

The subject invention specifically discloses a process for preparing a rubber composition having a high modulus which comprises reacting at least one thio acid with at least one polydiene rubber and at least one polyester. In most cases from about 20 phr to about 100 phr (parts per 100 parts of rubber by weight) of polyester will be utilized in the modification procedure. It is generally preferred to react the polyester with the thio acid at a temperature which is within the range of about 180° C. to about 200° C. to form a modified polyester containing mercaptan groups and to subsequently react the modified polyester with the rubber at a temperature which is within the range of about 180° C. to about 200° C. However, such reactions will be carried out at a temperature which is at least as high as the melting point of the polyester.

The rubber compositions of this invention can also be prepared by reacting maleic anhydride with the rubber and at least one polyester. This procedure grafts polymer chains which are comprised of polyester onto the polymer chains of the rubber.

The subject invention specifically discloses a process for preparing a rubber composition having a high modulus which comprises reacting maleic anhydride with at least one polydiene rubber and at least one polyester. In most cases from about 20 phr to about 100 phr of polyester will be utilized in the modification procedure. It is generally preferred to react the rubber with the maleic anhydride at a temperature which is within the range of about 180° C. to about 200° C. to form a rubber/maleic anhydride adduct and to subsequently react the rubber/maleic anhydride adduct with the polyester at a temperature which is at least as high as the melting point of the polyester.

The rubber compositions of this invention can further be prepared by epoxidizing the rubber and subsequently allowing the epoxidized rubber to react with the polyester This procedure grafts polymer chains which are comprised of the polyester onto the polymer chains of the rubber.

The subject invention specifically discloses a process for preparing a rubber composition having a high modulus which comprises reacting at least one epoxidized rubber with at least one polyester at a temperature which is within the range of about 140° C to about 300° C. In most cases from about 20 phr to about 100 phr of the polyester will be reacted with the epoxidized rubber.

DETAILED DESCRIPTION OF THE INVENTION

The process of this invention can be utilized to modify virtually any type of rubbery elastomer which contains double bonds. The rubbers which are modified in accordance with this invention typically contain repeat units which are derived from diene monomers, such as conjugated diene monomers and/or nonconjugated diene monomers. Such conjugated and nonconjugated diene monomers typically contain from 4 to about 12 carbon atoms and preferably contain from 4 to about 8 carbon atoms. Some representative examples of suitable diene monomers include 1,3-butadiene, isoprene, 2,3-dimethyl-1,3-butadiene, 2-methyl-1,3-pentadiene, 3,4-dimethyl-1,3-hexadiene, 4,5-diethyl-1,3-octadiene, phenyl-1,3-butadiene and the like. The polydiene rubber can also contain various vinyl aromatic monomers, such as styrene, 1-vinylnaphthalene, 2-vinylnaphthalene, α-methylstyrene, 4-phenylstyrene, 3-methylstyrene, and the like. Some representative examples of polydiene rubbers that can be modified by utilizing the procedure of this invention include polybutadiene, styrene-butadiene rubber (SBR), synthetic polyisoprene, natural rubber, isoprene-butadiene rubber, isoprene-butadiene-styrene rubber, nitrile rubber, carboxylated nitrile rubber, and EPDM rubber. The technique of this invention is particularly well suited for utilization in modifying natural rubber, synthetic polyisoprene, and cis-1,4-polybutadiene.

The thio acids which are utilized in modifying the polydiene rubber are compounds which contain at least one carboxyl group and at least one thiol group (mercaptan group). The thio acids that can be used can have the structural formula HS—A—COOH wherein A represents an alkylene group containing from about 1 to about 10 carbon atoms. Some representative examples of such thio acids include thio glycolic acid (mercapto acetic acid), thio lactic acid (2-mercaptopropionic acid), mercaptobutanoic acid, mercaptopentanoic acid, and mercaptohexanoic acid. Thio acids which contain one mercaptan group and two carboxyl groups can also be employed. Thio maleic acid is a representative example of such a thio acid which contains two carboxyl groups in addition to a mercaptan group The most preferred thio acids for utilization in accordance with this invention are dithio diacids. Such dithio diacids have the general structural formula HOOC—A—S—S—A—COOH wherein A represents an alkylene group containing from 1 to about 10 carbon atoms Some representative examples of such dithio diacids include dithio diacetic acid, dithio dipropanoic acid, dithio dibutanoic acid, dithio dipentanoic acid, and dithio dihexanoic acid. Dithio dipropanoic acid is the most highly preferred of the dithio diacids.

The utilization of mercaptans in chemical processes is generally associated with undesirable odors. However, dithio diacids can be utilized in the process of this invention with virtually no undesirable odors being generated Additionally, dithio diacids react readily with both the polydiene rubber and the polyester being utilized in the modification procedure Epoxidized rubbers can be prepared by utilizing numerous procedures any of which are suitable for preparing the epoxidized rubber utilized in the process of this invention For instance, rubbers can be epoxidized with any of a number of peroxides, such as perbenzoic acid or performic acid Rubbers are typically epoxidized in an organic solvent or latex. The organic solvent utilized will normally be a paraffinic or cycloparaffinic compound Such solvents will normally contain from about 4 to about 10 carbon atoms per molecule and will be liquids under the conditions of the epoxidization reaction Some representative examples of suitable solvents include pentane, isooctane, normal-hexane, cyclohexane, normal-heptane, and the like, alone or in admixture. The epoxidization reaction will generally be carried out at a temperature which is within the range of about $-10°$ C. to about $80°$ C. The epoxidization will preferably be carried out at a temperature which is within the range of about $15°$ C. to about $45°$ C. For the sake of convenience, the epoxidization will normally be carried out at ambient temperature which will generally be within the range of about $20°$ C. to about $25°$ C. Some representative examples of peracids which can be utilized to epoxidize the rubber include performic acid, peracetic acid, perpropanoic acid, perbutanoic acid, 2-methylperpropanoic acid, perpentanoic acid, perpalmitic acid, perstearic acid, chloroperacetic acid, dichloroperacetic acid, trichloroperacetic acid, trifluoroperacetic acid, 2-chloroperbutanoic acid, 3-chloroperbutanoic acid, 4-chloroperbutanoic acid, methoxyperacetic acid, perbenzoic acid, meta-chloroperbenzoic acid, phenylperacetic acid, and the like. The peroxidization of the rubber can be carried out by simply adding the peracid to the rubber cement. In the alternative, the reaction can be performed by adding hydrogen peroxide and a carboxylic acid separately to the rubber cement to generate the peracid in situ. The epoxidization reaction is stereospecific. That is, a trans-microstructure in the rubber produces a trans-epoxide with the cis-microstructure in the polymer producing cis-epoxides. Excess peracids and acid decomposition byproducts, which remain after the epoxidization reaction has been completed, can be stripped from the rubber cement, such as by volatilization, or can be neutralized with a base, such as sodium hydroxide.

It will normally not be necessary to epoxidize more than about 40% of the double bonds in the rubber utilized in preparing the rubber compositions of this invention. In most cases, it will be preferred to epoxidize from about 0.05 to about 10% of the double bonds in the rubber. It is generally desirable to minimize the amount of epoxidization to prevent the unnecessary alteration of rubber properties. Accordingly, it is generally most preferred to epoxidize only from about 0.1% to about 2% of the double bonds present in the rubber As a general rule, the polyesters utilized in modifying the rubbers of this invention will have a melting point of less than about $240°$ C. In most cases it is preferable for the polyester to have a melting point of less than about $200°$ C. The polyester utilized to modify the rubber will typically be a polyester elastomer. Virtually any type of polyester elastomer having a melting point of less than about $240°$ C. can be used. Such polyester elastomers are widely available commercially.

For instance, E. I. du Pont de Nemours & Company sells suitable polyester elastomers under the trademark Hytrel ™. Dupont Hytrel ™ 5555 has been determined to be highly suitable for use as a polyester elastomer in the high modulus rubber compositions of this invention.

The polyester elastomers used in the high modulus rubber compositions of this invention will normally contain both polyether and polyester segments. For example, such a polyester elastomer is comprised of the reaction product of (a) terephthalic acid or a dialkyl ester thereof, (b) a dimer acid, (c) a poly(tetramethylene oxide) glycol and (d) 1,4-butane diol. Polyester elastomers of this general type are described in greater detail in U.S. Pat. No. 4,254,001, which is hereby incorporated herein by reference in its entirety. Similar polyester elastomers which additionally contain chain branching agents and ionic compounds are described in U.S. Pat. No. 4,383,106 and U.S. Pat. No. 4,390,687. U.S. Pat. Nos. 2,623,031, 3,023,192, 3,651,014, 3,763,109, 3,766,146, 3,896,078, 4,013,624 and 4,264,761, all of which are incorporated herein by reference in their entirety, also described polyester elastomers and techniques that can be utilized in their preparation The modified rubber compositions of this invention can be prepared by simply reacting the thio acid with the polydiene rubber and the polyester. This can be accomplished by simply mixing the thio acid homogeneously throughout a blend of the polydiene rubber and the polyester and heating the thio acid/polyester/polydiene rubber blend The mercaptan groups on the thio acid will add to double bonds present in the polydiene rubber and the carboxyl groups in the thio acid will react with hydroxyl groups present in the polyester. This reaction causes polyester chains to be grafted onto the backbone of the polydiene rubber. This reaction can be depicted as follows:

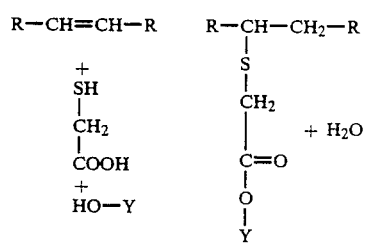

wherein R represents chains of the rubber and wherein Y represents polymer chains of the polyester. In the reaction depicted, thio glycolic acid was utilized to graft polyester onto the polydiene rubber The modification procedure of this invention can be carried out utilizing several satisfactory techniques. For instance, the thio acid, polyester, and polydiene rubber can be simultaneously mixed together and heated to graft the polyester onto the rubber. In another scenario, the thio acid can be reacted with the rubber to produce a rubber having carboxyl groups bound thereto and the rubber can then be subsequently reacted with the polyester to produce the modified rubber of this invention. In the preferred technique of this invention, the thio acid is first reacted with the polyester to produce a modified polyester containing mercaptan groups and the modified polyester is subsequently reacted with the rubber. It is preferred to prereact the thio acid with the polyester in a first reaction step and to subsequently react the reaction product with the rubber because the rubber is subjected to elevated temperatures for a shorter duration of time and accordingly less degradation occurs.

The reaction between the thio acid and the polyester will typically be carried out at a temperature which is within the range of about 150° C. to about 300° C. It will preferably be carried out at a temperature which is within the range of about 165° C. to about 250° C. and will more preferably be conducted at a temperature which is within the range of about 180° C. to about 200° C. The reaction between the rubber and the polyester will typically be carried out at a temperature which is within the range of about 120° C. to about 250° C. In most cases it will be preferred to carry out the reaction between the thio acid and the rubber at a temperature within the range of about 125° C. to about 200° C. with the most preferred temperature range for the reaction being from about 130° C. to about 150° C. In cases where the thio acid is reacted with the polyester and the rubber simultaneously, a temperature which is within the range of about 150° C. to about 250° C. will be utilized. In such cases the simultaneous reaction between the thio acid, the polyester, and the rubber will more preferably be carried out at a temperature which is within the range of about 165° C. to about 200° C. However, reactions between the thio acid and the polyester and reactions between the rubber and modified polyester containing mercaptan groups will be carried out at a temperature which is at least as high as the melting point of the polyester. In other words, reactions which are carried out in the presence of polyester will be conducted at a temperature which is at least as high as the melting point of the polyester. In most cases, preferred reaction temperatures will be slightly above the melting point of the polyester.

The thio acid is mixed throughout the rubber and/or the polyester utilizing conventional mixing procedures. For example, the mixing can be carried out in a Banbury mixer or a mill mixer Normally, such blends will be prepared by mixing from about 20 phr to about 100 phr (parts per hundred parts of rubber) of the polyester throughout the polydiene rubber The polyester can, of course, be prereacted with the thio acid prior to mixing it with the rubber In most cases it will be preferred to utilize from about 25 phr to about 80 phr of polyester in the blend It will be typically more preferred to utilize from about 35 phr to about 65 phr of polyester in the blend. The amount of thio acid utilized will typically be within the range of about 0.1 phr to about 20 phr. In most cases it will be preferred to utilize from about 0.5 phr to about 3 phr. It is generally most preferred to utilize from about 0.8 phr to about 2 phr of the thio acid The modified rubber compositions of this invention can also be prepared by simply reacting the maleic anhydride with the polydiene rubber and the polyester. This can be accomplished by simply mixing the maleic anhydride homogeneously throughout a blend of the polydiene rubber and the polyester and heating the maleic anhydride/polyester/polydiene rubber blend The double bond in the maleic anhydride will react with the double bonds present in the polydiene rubber and the anhydride groups in the maleic anhydride will react with hydroxy groups and carboxyl groups present in the polyester. However, it is preferred for the polyester to have predominately hydroxyl groups at ends of its polymer chains since hydroxyl groups are much more reactive than carboxyl groups with anhydrides. This reaction causes polyester chains to be grafted onto the backbone of the polydiene rubber This reaction can be depicted as follows:

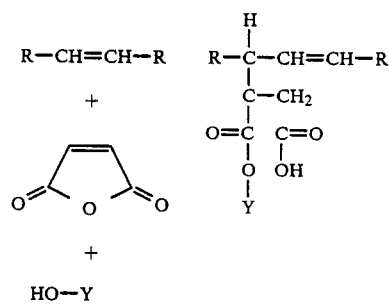

wherein R represents chains of the rubber and wherein Y represents polymer chains of the polyester. The free carboxyl groups generated by such reactions can theoretically further react with hydroxyl groups of other polyester chains to produce:

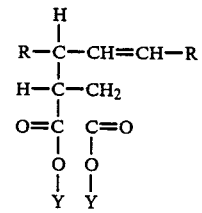

wherein two polyester chains are grafted onto the rubber by only one maleic anhydride molecule.

The maleic anhydride, polyester, and polydiene rubber can be simultaneously mixed together and heated to graft the polyester onto the rubber In another scenario, the maleic anhydride can be reacted with the rubber to produce a rubber/maleic anhydride adduct and the rubber/maleic anhydride adduct can then be subsequently reacted with the polyester to produce the modified rubber of this invention. In still another technique of this invention, the maleic anhydride is first reacted with the polyester to produce a polyester/maleic anhydride adduct and the polyester/maleic anhydride adduct is subsequently reacted with the rubber. It is desirable to prereact the maleic anhydride with the polyester in a first reaction step and to subsequently react the reaction product with the rubber because the rubber is subjected to elevated temperatures for a shorter duration of time and accordingly less degradation occurs.

The reaction between the maleic anhydride and the polyester will typically be carried out at a temperature which is within the range of about 150° C. to about 300° C. It will preferably be carried out at a temperature which is within the range of about 165° C. to about 250° C. and will more preferably be conducted at a temperature which is within the range of about 180° C. to about 200° C. However, such reactions between the maleic anhydride and the polyester will be carried out at a temperature which is at least as high as the melting point of the polyester. Reactions between rubber/maleic anhydride adducts and polyester will also be conducted within these temperature ranges.

The reactions between rubber and maleic anhydride and the reactions between rubber and polyester/maleic anhydride adducts will typically be carried out at a temperature which is within the range of about 150° C. to about 300° C. Such reactions will more typically be conducted at temperatures which are within the range of about 165° C. to about 250° C. The preferred temperature for such reactions depends upon the rubber being utilized and the reaction mechanism. For instance, most polydiene rubbers, such as high cis-1,4-polybutadiene, medium vinyl polybutadiene, SBR, synthetic polyisoprene, natural rubber, isoprene-butadiene rubber, nitrile rubber and isoprene-butadiene-styrene rubber, will react with maleic anhydride or polyester/maleic anhydride adducts at temperatures of greater than 180° C. by an electrocyclic reaction without the need to utilize a catalyst. The most preferred temperature for conducting such reactions is accordingly from about 180° C. to about 200° C. In cases where the polyester has a melting point of above 200° C. then the preferred reaction temperature is slightly above the melting point of the polyester. Such reactions can be carried out at lower temperatures by a free radical mechanism. However, free radicals lead to gel formation and such procedures are generally not desirable. In fact, it is beneficial to conduct such reactions which are carried out utilizing electrocyclic reaction mechanisms in the presence of free radical trapping antioxidants to inhibit gel formation. Some representative examples of free radical trapping antioxidants which can be used include (1) the reaction product of p-nonyl phenol, formaldehyde, and dodecane thiol-1 (Wingstay ® K) and (2) 2-(2-hydroxy-3-t-butyl-5methylbenzyl)4-methyl-6-t-butyl phenyl methacrylate.

EPDM rubber will generally not react with maleic anhydride or polyester/maleic anhydride adducts at commercially acceptable reaction rates by electrocyclic reaction mechanisms. For this reason, it is desirable to utilize a free radical reaction in reacting EPDM with maleic anhydride or polyester/maleic anhydride adducts. Such reactions are generally conducted at a temperature which is within the range of about 180° C. to about 210° C. Such reactions are conducted in the presence of one or more free radical catalysts. Some representative examples of free radical initiators which can be used include various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauroyl peroxide, cumene hydroperoxide, p-menthane hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1cyanocyclohexane, and the like the various alkyl perketals, such as 2,2-bis-(t-butylperoxy)-butane, ethyl 3,3-bis(1-butylperoxy)butyrate, 1,1-di-(t-butylperoxy) cyclohexane, and the like Mercapto benzothiazyl disulfide is a preferred free radical catalyst.

The maleic anhydride is mixed throughout the rubber and/or the polyester utilizing conventional mixing procedures. For example, the mixing can be carried out in a Banbury mixer or a mill mixer Normally, such blends will be prepared by mixing from about 20 phr to about 100 phr of the polyester throughout the polydiene rubber. The polyester can, of course, be prereacted with the maleic anhydride prior to mixing it with the rubber. In most cases it will be preferred to utilize from about 20 phr to about 80 phr of polyester in the blend. It will be typically more preferred to utilize from about 35 phr to about 65 phr of polyester in the blend. The amount of maleic anhydride utilized will typically be within the range of about 0 1 phr to about 20 phr. In most cases it will be preferred to utilize from about 0 5 phr to 3 phr of maleic anhydride It is generally most preferred to utilize from about 0.8 phr to about 2 phr of the maleic anhydride.

In an alternative embodiment of this invention, high modulus rubber compositions can be prepared by simply reacting an epoxidized rubber with the polyester. This is accomplished by simply mixing the polyester homogeneously throughout the epoxidized rubber and heating the polyester/epoxidized rubber blend. Normally, such blends will be prepared by mixing from about 20 phr to about 100 phr of polyester throughout the rubber. This can be accomplished using conventional mixing techniques. For example, the mixing can be carried out in a Banbury mixer or a mill mixer. In most cases, it will be preferred to utilize from about 25 phr to about 80 phr of polyester in the blend. It will be typically more preferred to utilize from about 35 phr to about 65 phr of polyester in the blend. After the polyester/epoxidized rubber blend has been prepared, it can be simply heated to a temperature which is within the range of about 140° C. to about 300° C. to produce the rubber compositions of this invention. The polyester will preferably be reacted with the epoxidized rubber at a temperature which is within the range of about 160° C. to about 270° C. It will generally be most preferred to carry out the reaction between the polyester and epoxidized rubber at a temperature which is within the range of about 170° C. to about 250° C. The preferred reaction temperature will generally be slightly above the melting point of the polyester being utilized.

Polyesters typically contain hydroxyl end groups. These hydroxyl end groups are believed to react with epoxide groups on the epoxidized rubber to form the rubber compositions of this invention. This reaction can be depicted as follows:

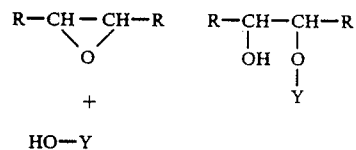

wherein R represents chains of the rubber and wherein Y represents chains of the polyester. As can be seen, the polyester chains are grafted onto the backbone of the rubbery polymer forming the rubber compositions of this invention.

This invention is illustrated by the following working examples which are presented merely for the purpose of illustration and are not to be regarded as limiting the scope of the invention or the manner in which it can be practiced. Unless specifically indicated otherwise, parts and percentages are given by weight.

EXAMPLES 1-11

In this series of experiments, high cis-1,4-polyisoprene was modified with a variety of polyester elastomers in accordance with the process of this invention. The modification procedure was carried out in a 280 gram Brabender preparative mixer which was electrically heated. In this series of modification procedures, the cis-1,4-polyisoprene was mixed with 25 phr of the polyester elastomer specified in Table I, 0.75 phr of maleic anhydride, 0.5 phr of phenothiazine (a high temperature antidegradant) and 0.5 phr of a stabilizer. The maleic anhydride, antidegradant, and stabilizer were added with the rubber at the beginning of the mix cycle. After three minutes, when the temperature was up to about 190° C., the polyester elastomer was added with mixing being continued for an additional 4.5 minutes at the same temperature or a higher temperature, if it was necessary to melt the polyester elastomer. The maximum mixing temperature utilized is specified in Table I.

high levels of stiffness without increasing the state of cure.

EXAMPLES 12-15

In this series of experiments, a thioacid was utilized in grafting a polyester elastomer onto high cis-1,4-polybutadiene. In this series of experiments, the thioacid was reacted with the rubber by mixing 1.0 phr of dithiodipropionic acid and 0.5 phr of phenothiazine with the rubber in a Banbury mixer at 130-150° C. for 5 minutes. The thioacid modified rubber prepared was then mixed with various amounts of Hytrel ™ 5555 in a Brabender mixer which was maintained at 200° C. for 7 minutes. The amount of Hytrel ™ 5555 (the polyester elastomer) utilized in each example is specified in Table II.

The modified rubbers made were then cured utilizing the procedure specified in Examples 1-11. The physical properties of the cured rubber samples made are given in Table II.

TABLE II

| Ex | Amount of Polyester | 50%* Modulus | 100%* Modulus | Tensile* Strength | Elongation |
|----|---------------------|--------------|---------------|-------------------|------------|
| 12 | 25 phr | 2.0 | 3.6 | 18.2 | 420% |
| 13 | 45 phr | 2.0 | 3.5 | 18.2 | 410% |
| 14 | 67 phr | 1.8 | 3.4 | 22.3 | 460% |
| 15 | 100 phr | 1.8 | 3.3 | 20.3 | 460% |

*Given in mega pascals

As can be determined by reviewing Table II, very

TABLE I

| Example | Polyester Elastomer | Polyester M.P. | Maximum Mixing Temp. | 50%* Modulus | 100%* Modulus | Tensile* | Elongation |
|---------|---------------------|----------------|----------------------|--------------|---------------|----------|------------|
| 1 | Elastuf ® VAR 10,150 | 155° C. | 191° C. | 1.9 | 2.6 | 16.0 | 490% |
| 2 | Elastuf ® VAR 10,035 | 123° C. | 196° C. | 2.1 | 2.8 | 16.6 | 500% |
| 3 | Elastuf ® VAR 10,150 | 155° C. | 194° C. | 1.6 | 2.2 | 14.0 | 510% |
| 4 | Hytrel ™ 4056 | 146° C. | 199° C. | 1.7 | 2.4 | 14.9 | 500% |
| 5 | Hytrel ™ 4059 | 186° C. | 199° C. | 1.2 | 1.9 | 19.8 | 600% |
| 6 | Hytrel ™ 5544 | 214° C. | 212° C. | 1.4 | 2.7 | 18.8 | 470% |
| 7 | Hytrel ™ 5555 | 200° C. | 207° C. | 2.3 | 4.4 | 20.4 | 390% |
| 8 | Hytrel ™ 4074 | 169° C. | 195° C. | 1.5 | 2.2 | 13.7 | 490% |
| 9 | Hytrel ™ 7246 | 217° C. | 217° C. | 1.9 | 3.6 | 16.4 | 390% |
| 10 | Elastuf ® VAR 10,150 | 155° C. | 195° C. | 1.6 | 2.3 | 14.6 | 530% |
| 11 | — | — | — | 0.9 | 1.7 | 22.2 | 510% |

*Given in mega pascals

The rubber compositions made were compounded with 45 phr of carbon black, 9 phr of an oil, 2 phr of N-phenyl-N'-(1,3-dimethylbutyl)-p-phenylenediamine, 1 phr of diaryl-p-phenylene diamine, 1 phr of a wax, 3 phr of stearic acid, 3 phr of zinc oxide, 0.8 phr of N-oxydiethylene benzothiazole-2-sulfenamide, 0.4 phr of diphenyl guanidine, and 1.6 phr of insoluble sulfur The rubber compositions were then cured at 300° F (149° C) for 25 minutes. The 50% modulus, 100% modulus, tensile strength and elongation of the cured rubber samples made are reported in Table I Table I clearly shows that the polyester modified rubbers of this invention have significantly higher modulus than does unmodified high cis-1,4-polyisoprene (see Example 11 which was done as a control) A particularly high modulus was achieved in Example 7 which utilized Hytrel ™ 5555 as the polyester elastomer for modifying the rubber. The modified rubber made in Example 7 was also determined to have a tan delta at 0° of 0.108 and a tan delta at 60° of 0102. The control (Example 11) had a tan delta at 0° of 0.161 and a tan delta at 60° of 0.078. This series of experiments clearly shows that rubbers can be modified in accordance with this invention utilizing polyester elastomers to attain significant improvements in the modulus and tensile strength of the polyisoprene were realized by utilizing the thioacid in the modification procedure. For instance, in Example 12, a 50% modulus of 2.0 mPa and a 100% modulus of 3.6 mPa was realized. In the control a 50% modulus of only 0.9 mPa and a 100% modulus of only 1.7 mPa was realized. Thus, the modification procedure more than doubled the modulus of the rubber. The modified rubber made in Example 12 also had a tan delta at 0° C. of 0.104 and a tan delta at 60° C. of 0.101. The modified rubber made in Example 15 had a tan delta at 0° C. of 0.143 and a tan delta at 60° C. of 0.102.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a rubber composition having a high modulus which comprises reacting at least one epoxidized rubber containing double bonds and which is comprised of repeat units which are derived from conjugated diene monomers and/or nonconjugated diene monomers with from about 20 phr to about 100 phr of at least one polyester elastomer having a melting point of less than about 240° C. at a temperature which is within the range of about 140° C. to about 300° C.

2. A process as specified in claim 1 wherein the epoxidized rubber is less than about 40 mole percent epoxidized.

3. A process as specified in claim 1 wherein from about 0.05 to about 10 percent of the double bonds in the epoxidized rubber have been epoxidized.

4. A process as specified in claim 1 wherein from about 0.1 to about 2 percent of the double bonds in the epoxidized rubber have been epoxidized.

5. A process as specified in claim 1 wherein the polyester elastomer has a melting point of less than about 200° C.

6. A process as specified in claim 1 wherein from about 25 phr to about 80 phr of the polyester elastomer is utilized.

7. A process as specified in claim 1 wherein from about 35 phr to about 65 phr of the polyester elastomer is utilized.

8. A process as specified in claim 1 wherein the process is conducted at a temperature within the range of about 160° C. to about 270°) c.

9. A process as specified in claim 1 wherein the process is conducted at a temperature within the range of about 170° C.

10. The rubber composition made by the process specified in claim.

11. The rubber composition made by the process specified in claim 2.

12. The rubber composition made by the process specified in claim 3.

13. The rubber composition made by the process specified in claim 4.

14. The rubber composition made by the process specified in claim 5.

15. The rubber composition made by the process specified in claim 6.

16. The rubber composition made by the process specified in claim 7.

17. The rubber composition made by the process specified in claim 8.

18. The rubber composition made by the process specified in claim 9.

* * * * *